United States Patent
Merriman et al.

(10) Patent No.: US 8,566,154 B2
(45) Date of Patent: Oct. 22, 2013

(54) NETWORK FOR DISTRIBUTION OF RE-TARGETED ADVERTISING

(75) Inventors: Dwight A Merriman, New York, NY (US); Kevin J O'Connor, New York, NY (US)

(73) Assignee: Google Inc., Mountain View, CA (US)

( * ) Notice: Subject to any disclaimer, the term of this patent is extended or adjusted under 35 U.S.C. 154(b) by 2715 days.

(21) Appl. No.: 10/082,069

(22) Filed: Feb. 26, 2002

(65) Prior Publication Data

US 2002/0082923 A1 Jun. 27, 2002

Related U.S. Application Data

(63) Continuation of application No. 09/362,008, filed on Jul. 27, 1999, and a continuation-in-part of application No. 09/094,949, filed on Jun. 15, 1998.

(60) Provisional application No. 60/095,146, filed on Aug. 3, 1998, provisional application No. 60/048,940, filed on Jun. 16, 1997, provisional application No. 60/049,877, filed on Jun. 17, 1997.

(51) Int. Cl.
*G06Q 30/00* (2012.01)

(52) U.S. Cl.
USPC .................. 705/14.23; 705/14.25; 705/14.51; 705/14.53

(58) Field of Classification Search
USPC ........................ 705/14.23, 14.25, 14.51, 14.53
See application file for complete search history.

(56) References Cited

U.S. PATENT DOCUMENTS

| 4,602,279 | A | 7/1986 | Freeman |
| 4,703,423 | A | 10/1987 | Bado et al. |
| 4,775,935 | A | 10/1988 | Yourick |
| 4,789,235 | A | 12/1988 | Borah et al. |
| 4,850,007 | A | 7/1989 | Marino et al. |
| 4,870,579 | A | 9/1989 | Hey |

(Continued)

FOREIGN PATENT DOCUMENTS

| DE | 19528911 A1 | 2/1997 |
| EP | 0 216 535 A2 | 4/1987 |

(Continued)

OTHER PUBLICATIONS

Improved Internet security enabling . . . , PC Week, v12, n11, p1(20, Mar. 20, 1995.*

(Continued)

*Primary Examiner* — Donald L. Champagne
(74) *Attorney, Agent, or Firm* — Fish & Richardson P.C.

(57) ABSTRACT

A computer system for automatic replacement of advertisements includes an advertising server for selecting an advertisement based on criteria related to the individual viewer. In particular, advertisements are selected for a given user, based on the past behavior of that specific given user. Advertiser web sites on the network are configured to anonymously report back user activity such as visit dates, purchases, specific product pages visited and the like. Alternative reporting embodiments include email, file transfer protocol and spotlight tags. User activity lists are processed to select candidates for re-targeting. Candidates for re-targeted advertisements are identified based on their own individual past activity, and stored in a list of candidate user ID's. When a candidate on the re-targeted list is identified at any network affiliate web site, a re-targeted advertisement is delivered to the candidate user.

59 Claims, 3 Drawing Sheets

(56) References Cited

U.S. PATENT DOCUMENTS

| | | |
|---|---|---|
| 4,996,642 A | 2/1991 | Hey |
| 5,027,400 A | 6/1991 | Baji et al. |
| 5,099,422 A | 3/1992 | Foresman et al. |
| 5,105,184 A | 4/1992 | Pirani et al. |
| 5,155,591 A | 10/1992 | Wachob |
| 5,166,866 A | 11/1992 | Kim et al. |
| 5,191,410 A | 3/1993 | McCalley et al. |
| 5,220,501 A | 6/1993 | Lawlor et al. |
| 5,253,341 A | 10/1993 | Rozmanith et al. |
| 5,260,778 A | 11/1993 | Kauffman et al. |
| 5,261,094 A | 11/1993 | Everson et al. |
| 5,283,731 A * | 2/1994 | Lalonde et al. ............... 364/401 |
| 5,305,195 A | 4/1994 | Murphy |
| 5,347,632 A | 9/1994 | Filepp et al. |
| 5,355,327 A | 10/1994 | Stent et al. |
| 5,361,393 A | 11/1994 | Rossillo |
| 5,377,354 A | 12/1994 | Scannell et al. |
| 5,412,416 A * | 5/1995 | Nemirofsky .................... 348/10 |
| 5,442,771 A | 8/1995 | Filepp et al. |
| 5,446,891 A | 8/1995 | Kaplan et al. |
| 5,446,919 A | 8/1995 | Wilkins |
| 5,448,625 A * | 9/1995 | Lederman ....................... 379/67 |
| 5,459,656 A | 10/1995 | Fields et al. |
| 5,469,206 A | 11/1995 | Strubbe et al. |
| 5,475,819 A | 12/1995 | Miller et al. |
| 5,477,451 A | 12/1995 | Brown et al. |
| 5,499,046 A | 3/1996 | Schiller et al. |
| 5,504,744 A | 4/1996 | Adams et al. |
| 5,504,894 A | 4/1996 | Ferguson et al. |
| 5,515,098 A | 5/1996 | Carles |
| 5,515,270 A | 5/1996 | Weinblatt |
| 5,537,542 A | 7/1996 | Eilert et al. |
| 5,550,746 A | 8/1996 | Jacobs |
| 5,559,548 A | 9/1996 | Davis et al. |
| 5,566,353 A | 10/1996 | Cho et al. |
| 5,568,612 A | 10/1996 | Barrett et al. |
| 5,572,643 A | 11/1996 | Judson |
| 5,584,025 A | 12/1996 | Keithley et al. |
| 5,594,910 A | 1/1997 | Filepp et al. |
| 5,598,536 A | 1/1997 | Slaughter, III et al. |
| 5,600,364 A | 2/1997 | Hendricks et al. |
| 5,621,812 A | 4/1997 | Deaton et al. |
| 5,636,346 A | 6/1997 | Saxe |
| 5,638,457 A | 6/1997 | Deaton et al. |
| 5,649,114 A | 7/1997 | Deaton et al. |
| 5,675,662 A | 10/1997 | Deaton et al. |
| 5,692,132 A | 11/1997 | Hogan |
| 5,696,965 A | 12/1997 | Dedrick |
| 5,704,017 A | 12/1997 | Heckerman et al. |
| 5,704,018 A | 12/1997 | Heckerman et al. |
| 5,708,780 A | 1/1998 | Levergood et al. |
| 5,710,887 A | 1/1998 | Chelliah et al. |
| 5,712,979 A | 1/1998 | Graber et al. |
| 5,717,860 A | 2/1998 | Graber et al. |
| 5,717,923 A | 2/1998 | Dedrick |
| 5,721,827 A | 2/1998 | Logan et al. |
| 5,724,424 A | 3/1998 | Gifford |
| 5,724,521 A | 3/1998 | Dedrick |
| 5,727,156 A | 3/1998 | Herr-Hoyman et al. |
| 5,734,720 A | 3/1998 | Salganicoff |
| 5,734,828 A | 3/1998 | Pendse et al. |
| 5,737,619 A | 4/1998 | Judson |
| 5,740,252 A * | 4/1998 | Minor et al. .................... 380/49 |
| 5,740,549 A | 4/1998 | Reilly et al. |
| 5,745,681 A | 4/1998 | Levine et al. |
| 5,751,956 A | 5/1998 | Kirsch |
| 5,752,022 A | 5/1998 | Chiu et al. |
| 5,754,772 A * | 5/1998 | Leaf ........................ 395/200.33 |
| 5,754,938 A | 5/1998 | Herz et al. |
| 5,754,939 A | 5/1998 | Herz et al. |
| 5,757,917 A * | 5/1998 | Rose et al. ...................... 380/25 |
| 5,761,601 A | 6/1998 | Nemirofsky et al. |
| 5,768,521 A | 6/1998 | Dedrick |
| 5,774,170 A | 6/1998 | Hite et al. |
| 5,778,367 A | 7/1998 | Wesinger, Jr. et al. |
| 5,781,894 A | 7/1998 | Petrecca et al. |
| 5,787,253 A | 7/1998 | McCreery et al. |
| 5,790,426 A | 8/1998 | Robinson |
| 5,790,935 A | 8/1998 | Payton |
| 5,794,210 A | 8/1998 | Goldhaber et al. |
| 5,796,945 A | 8/1998 | Tarabella |
| 5,796,952 A | 8/1998 | Davis et al. |
| 5,809,242 A | 9/1998 | Shaw et al. |
| 5,812,769 A | 9/1998 | Graber et al. |
| 5,812,776 A | 9/1998 | Gifford |
| 5,815,148 A | 9/1998 | Tanaka |
| 5,819,285 A | 10/1998 | Damico et al. |
| 5,823,879 A * | 10/1998 | Goldberg et al. ............... 463/42 |
| 5,838,790 A | 11/1998 | McAuliffe et al. |
| 5,842,199 A | 11/1998 | Miller et al. |
| 5,848,396 A | 12/1998 | Gerace |
| 5,848,397 A | 12/1998 | Marsh et al. |
| 5,855,008 A | 12/1998 | Goldhaber et al. |
| 5,870,724 A | 2/1999 | Lawlor et al. |
| 5,873,068 A | 2/1999 | Beaumont et al. |
| 5,893,075 A | 4/1999 | Plainfield et al. |
| 5,913,040 A | 6/1999 | Rakavy et al. |
| 5,918,014 A | 6/1999 | Robinson |
| 5,933,811 A * | 8/1999 | Angeles et al. ................. 705/14 |
| 5,933,827 A | 8/1999 | Cole et al. |
| 5,937,392 A | 8/1999 | Alberts |
| 5,946,646 A | 8/1999 | Schena et al. |
| 5,948,061 A | 9/1999 | Merriman et al. |
| 5,950,173 A | 9/1999 | Perkowski |
| 5,956,024 A | 9/1999 | Strickland et al. |
| 5,960,409 A * | 9/1999 | Wexler ........................... 705/14 |
| 5,960,429 A | 9/1999 | Peercy et al. |
| 5,990,927 A | 11/1999 | Hendricks et al. |
| 5,999,912 A | 12/1999 | Wodarz et al. |
| 6,002,393 A | 12/1999 | Hite et al. |
| 6,005,566 A | 12/1999 | Jones et al. |
| 6,005,567 A | 12/1999 | Nielsen |
| 6,006,197 A | 12/1999 | D'Eon et al. |
| 6,006,252 A | 12/1999 | Wolfe |
| 6,016,509 A | 1/2000 | Dedrick |
| 6,020,887 A | 2/2000 | Loring et al. |
| 6,026,368 A | 2/2000 | Brown et al. |
| 6,029,195 A | 2/2000 | Herz |
| 6,049,777 A | 4/2000 | Sheena et al. |
| 6,049,878 A | 4/2000 | Caronni et al. |
| 6,052,554 A | 4/2000 | Hendricks et al. |
| 6,061,659 A | 5/2000 | Murray |
| 6,070,147 A * | 5/2000 | Harms et al. ................ 705/14.25 |
| 6,119,101 A | 9/2000 | Peckover |
| 6,182,050 B1 | 1/2001 | Ballard |
| 6,185,586 B1 | 2/2001 | Judson |
| 6,223,215 B1 | 4/2001 | Hunt et al. |
| 6,247,047 B1 | 6/2001 | Wolff |
| 6,285,987 B1 * | 9/2001 | Roth et al. ....................... 705/27 |
| 6,434,614 B1 | 8/2002 | Blumenau |
| 6,466,970 B1 | 10/2002 | Lee et al. |
| 6,615,251 B1 | 9/2003 | Klug et al. |
| 6,718,551 B1 | 4/2004 | Swix et al. |
| 6,757,662 B1 | 6/2004 | Greenwald et al. |
| 6,757,710 B2 | 6/2004 | Reed |
| 7,039,599 B2 | 5/2006 | Merriman et al. |
| 2002/0013785 A1 | 1/2002 | Miyazaki et al. |
| 2002/0019831 A1 | 2/2002 | Wade |
| 2002/0046118 A1 | 4/2002 | Minte |
| 2002/0082923 A1 * | 6/2002 | Merriman et al. ............... 705/14 |
| 2002/0099600 A1 | 7/2002 | Merriman et al. |
| 2002/0103698 A1 | 8/2002 | Cantrell |
| 2003/0023489 A1 | 1/2003 | McGuire et al. |

FOREIGN PATENT DOCUMENTS

| | | |
|---|---|---|
| EP | 0 216 535 A3 | 4/1987 |
| EP | 0 355 697 A2 | 2/1990 |
| EP | 0 355 697 A3 | 2/1990 |
| EP | 0 355 697 B1 | 2/1990 |
| EP | 0 643 359 A2 | 3/1995 |
| EP | 0 643 359 A3 | 3/1995 |
| EP | 0 749 081 A1 | 12/1996 |
| EP | 0 875 843 A1 | 11/1997 |

(56) References Cited

FOREIGN PATENT DOCUMENTS

| | | |
|---|---|---|
| EP | 0 814 419 A2 | 12/1997 |
| EP | 0 818 742 A1 | 1/1998 |
| EP | 0 834 822 A2 | 4/1998 |
| EP | 0 834 822 A3 | 4/1998 |
| EP | 0 837 407 A1 | 4/1998 |
| EP | 0 838 769 A2 | 4/1998 |
| EP | 0 849 689 A2 | 6/1998 |
| EP | 0 849 689 A3 | 6/1998 |
| EP | 0 864 990 A2 | 9/1998 |
| EP | 0 864 990 A3 | 9/1998 |
| EP | 0 869 448 A1 | 10/1998 |
| EP | 0 749 081 B1 | 11/1998 |
| EP | 0 877 314 A1 | 11/1998 |
| EP | 0 897 158 A1 | 2/1999 |
| EP | 0 897 158 A4 | 2/1999 |
| JP | H5143653 A | 6/1993 |
| JP | 9091215 | 4/1997 |
| JP | 09231264 | 9/1997 |
| JP | 10011508 | 1/1998 |
| JP | 10049591 A | 2/1998 |
| WO | WO 84/01382 A1 | 4/1984 |
| WO | WO 84/01382 A4 | 10/1984 |
| WO | WO 84/01382 B1 | 10/1984 |
| WO | WO 93/16443 A1 | 8/1993 |
| WO | WO 93/19427 A1 | 9/1993 |
| WO | WO 94/23383 A1 | 10/1994 |
| WO | WO 95/12176 A2 | 5/1995 |
| WO | WO 95/12176 A3 | 5/1995 |
| WO | WO 95/12176 A4 | 5/1995 |
| WO | WO 95/13587 A1 | 5/1995 |
| WO | WO 95/16971 A1 | 6/1995 |
| WO | WO 95/16971 A4 | 6/1995 |
| WO | WO 96/31848 A2 | 9/1996 |
| WO | WO 96/31848 A3 | 9/1996 |
| WO | WO 96/30864 A1 | 10/1996 |
| WO | WO 96/36926 A1 | 11/1996 |
| WO | WO 96/38796 A1 | 12/1996 |
| WO | WO 96/39668 A1 | 12/1996 |
| WO | WO 97/07656 A2 | 3/1997 |
| WO | WO 97/07656 A3 | 3/1997 |
| WO | WO 97/21183 A1 | 6/1997 |
| WO | WO 97/41673 A2 | 11/1997 |
| WO | WO 97/41673 A3 | 11/1997 |
| WO | WO 96/38796 B1 | 3/1998 |
| WO | WO 98/34189 A1 | 9/1998 |
| WO | WO 98/57275 A2 | 12/1998 |
| WO | WO 98/57275 A3 | 12/1998 |
| WO | WO 98/57285 A1 | 12/1998 |
| WO | WO 01/65747 A1 | 9/2001 |

OTHER PUBLICATIONS

Cashing in: The rush is on to buy and sell on the Internet, Interactive Media & Marketing, Adv. Age, p. 11, Dec. 14, 1994.*
Interactive access: Internet marketing revolution . . . , EDGE Computer Report, v7,n316, p2(1), Mar. 20, 1995.*
Preston Gralla, How the Internet Works, Aug. 1999, Millennium Edition, 202-204 and 243-247.*
Kohda Y, et al., "Ubiquitious advertising on the WWW: Merging Advertising on the Browser", Computer Networks and ISDN Systems, vol. 28, No. 11, May 1996, pp. 1493-1499.
17625888; Java and Blackbird: extending the Web . . . ; Seybold Reoport on Publishing Systems; Oct. 23, 1995.
17497026; Look who's surfing . . . ; Schurr; PC Week; Oct. 30, 1995.
17594025; HotWired and Neilsem team to verify usage data; Electronic Marketplace Report; Jul. 4, 1995.
17225819; Write once, publish many times; Ratcliffe; Digital Media; Aug. 7, 1995.
17189959; Product View seeks funding for 3Q launch of ad-supported . . . ; Electronic Marketplace Report; May 16, 1995.
17244186; Free E-Mail with Postage Stamp "Ads"; Newsbytes; Jul. 3, 1995.
CWK19951009S0006; Search-engine advertising; Frook; Communications Week; Nov. 9, 1995.
www5conf.inria.fr; Ubiquitous Advertising on the WWW; Kohda et al; Fifth International WWW Conference; May 6-10, 1996.
Bounty Quest home page article titled DoubleClick Bounty Paid Ad Pioneer Turned Online Porn Mogul Wins $10,000; (<http://www.bountyquest.com/>; printed on Mar. 9, 2001).
Bounty Quest Web page displaying article titled Bounty Collected Double Click Banner Ad Patent; (http://www.bountyquest.com/bounties/displayBounty.php?bountyName=1019; printed on Mar. 9, 2001).
Bounty Quest Web page displaying article titled Digital Porn Mogul Wins Silver Bullet Award; (http://www.bountyquest.com/winner/bschuster.htm; printed on Mar. 9, 2001).
Bounty Quest Web page displaying article titled DoubleClick Prior Art; (http://www.bountyquest.com/patentinfo/doucleclickart.htm; printed on Mar. 9, 2001).
Business Plan posted on Bounty Quest Website titled Summary of Proposed Business Activities for the World Wide Internet Network (WWIN); (http://www.bountyquest.com/images/doubleclickPage9.gif; printed on Mar. 9, 2001).
Sales Literature posted on Bounty Quest Website titled What You Get with WWIN; (http://bountyquest.com/images/doubleclickGet.gif; printed on Mar. 9, 2001).
CNET Press Release titled About CNET; (http://www.canada.cnet.com/aboutcnet/0-13613-7-808022.html; printed on Mar. 9, 2001).
ADMedium Newsletter linked from Bounty Quest Website; (http://uts.cc.utexas.edu/tecas/nl9$_{13}$ 2_96.html; printed on Apr. 4, 2001).
Booker, Ellis "Seeing a Gap, A Palo Alto Startup Will Debut Advertising Server for the Net", Web Week, v.2 iss. 2. Available online at http://internetworld.com. Feb. 1996.
Metcalf, Bob "From the Ether", InfoWorld, v.18 iss.3. Available at http://infoworld.com, Aug. 1996.
NetGravity AdServer 2.0 Announcement. Available at http://netgravity.com, Oct. 1996.
Kohda Yet al: Ubiquitious advertising on the WWW: Merging Advertising on the Browser, Computer Networks and ISDN Systems, vol. 28, No. 11, May 1996, pp. 1493-1499.
Cashing in: The rush is on to buy and sell on the Internet, Interactive Media & Marketing, Adv. Age, p. 11, Dec. 19, 1994.
Improved Internet security enabling . . . , PC Week, v12, n11, p1(2), Mar. 20, 1995.
Internet access: Internet marketing revolution . . . , EDGE Work-Group Computing Report, v7, n316, p2(1), Jun. 3, 1996.
"MediaLink: Bell Laboratories unveils sophisticated information insertion technology for broadcast and cable advertising," EDGE, v11, p43(1), Dec. 16, 1996.
"Infoseek Offers Web Advertisers Customized Delivery of Ads," Newsbytes, pNEW05270111, May 27, 1997.
Blankenhorn, Dana; "Sites experiment with advertising to offer free service," Advertising Age's Business Marketing, v82, p29, Jul. 1997.
Lockard, Meredith; "Advertising done your way," Target Marketing, v20, n10, p40, ISSN: 0889-5333, Oct. 1997.
"Ericsson Introduces New Intelligent Network-Based Internet Advertiser at Internet World '98," Business Wire, p0240, Oct. 7, 1998.
Chat Transcript; Topic: Ad Measurement and Management; Oct. 15, 1998; (http://www.zeff.com/learn/zdu/advertising/zinman.html; printed on Feb. 7, 2000).
CNET Press Release titled "CNET Online Signs Up More Than a Quarter of a Million Members Through Voluntary Registration after Only Five Months"; (http://home.cnet.com/aboutcnet/0-13613-7-808021.html; printed on Nov. 26, 1999).
Hypertext Markup Language—2.0; Nov. 1995 (Draft HTML 2.0 Specification; Sep. 22, 1995).
Webster's Third New International Dictionary of the English Language Unabridged, 1967, p. 2171 "some".
Microsoft Press Computer Dictionary Third Edition, 1997, p. 387 "proxy server".
Bill Harvey, The Expanded ARF Model: Bridge to the Accountable Advertising Future, Journal of Advertising Research, Mar./Apr. 1997, pp. 11-20.
Cespedes & Smith, Database Marketing: New Rules for Policy and Practice, Sloan Management Review, Summer, 1993, pp. 7-22.

(56) References Cited

OTHER PUBLICATIONS

Miller, B., "GroupLens: An Open Architecture for Collaborative Filtering," ftp://ftp.cs.umn.edu/users/bmiller/prop.ps, Univ. of Minn., pp. 1-18, Oct. 1995.
Upendra Shardanand, "*Social Information Filtering for Music Recommendation*" Sep. 1994, pp. 1-93, Massachusetts Institute of Technology, Thesis.
"WWW.barnesandnoble.com" ("WWW.firefly.com"), web site pages, 12 pages, printed out on Jan. 21, 1998 (origination date unknown).
"WWW.amazon.com", web site pages, 15 pages, printed out on Jan. 21, 1998 (origination date unknown).
Microsoft Press Computer Dictionary Third Edition, 1997, pp. 271 ("junction"), 285 ("link"), 331 ("node").
51st IETF—Whois enhancement BOF (whoisfix), Aug. 1, 2001.
Doubleclick Measures Beyond the Click With New "Spotlight" Software, Sep. 4, 1996, Doubleclick.
Doubleclick Unveils Internet Ad Tracking Product, Sep. 4, 1996, Reuter Financial Report.
Doubleclick Shines Its Spotlight, Sep. 5, 1996, Advertising Age—Interactive Daily.
Spotlight on Doubleclick, Sep. 13, 1996, Information & Interactive Services Report.
Tracking Services Tallies Ad Response, Online Orders, Sep. 16, 1996, DMNews.
Luring in Customers Via Web Advertising, Oct. 1996, Business Strategies.
Business Wire (New York, Nov. 17, 1998). "i33 Communications Links Personal Finance Sites With Dynamic Investment Research Banners; Quote.com and Multex Partner Using i33's AdMaximize Technology".
David E. Zinman (founder of FocaLink), Deposition Transcript from *DoubleClick, Inc.* v. *L90, Inc.*, 00 Civ. 2690, S.D.N.Y.
Ronald A. Kovas (CEO of FocaLink), Deposition Transcript from *DoubleClick, Inc.* v. *L90, Inc.*, 00 Civ. 2690, S.D.N.Y.
LinkMarket Business Plan; David Zinman et al.; SD005545-SD005569.
LinkMarket; David Zinman et al.; SD005573-SD005574.
"Online Marketing: . . . "; Internet Week, vol. 1, Issue 36; Dec. 18, 1995; SD005584-SD005585.
David Zinman; http://www.focalink.com/dzinman/bio.html; SD005586.
"Seeing a Gap . . . "; Ellis Booker; http://www.internetworld.com/print/1996/02/01/industry/ad-server.html; Feb. 1996; SD005587.
"readme. 1st; . . . "; David Evans; Marketing Computers, No. 2, vol. 16, p. 12; Feb. 1996; SD005588-SD005589.
"Focalink Will Monitor . . . "; Julia Angwin; San Francisco Chronicle; Feb. 7, 1996; SD005590.
"Media Daily Special: . . . "; Sean Butterbaugh; Media Daily, No. 5, vol. 4; Feb. 7, 1996; SD005591-SD005592.
"Internet Access: Major Companies . . . "; Edge: Work-Group Computing Report; Feb. 12, 1996; SD005593-SD005594.
"Internet Access: First Advertising . . . "; Edge: Work-Group Computing Report; Feb. 12, 1996; SD005595-SD005596.
"Internet Access: Major Companies . . . "; Edge: Work-Group Computing Report; Feb. 12, 1996; SD005597-SD005598.
"Another Media-Buying Firm . . . "; Media Daily, No. 5, vol. 4; Feb. 14, 1996; SD005599-SD005601.
"Working the Web; . . . "; Jennifer Reese; Executive Female, No. 2, vol. 19, p. 24; Mar. 13, 1996; SD005602-SD005604.
"Web ad-management software . . . "; John Evan Frook; InternetWeek; Mar. 18, 1996; SD005605-SD005607.
"Unraveling a tangled Web; . . . "; Ken Siegmann; PC Week, No. 15, vol. 13, p. A4; Apr. 15, 1996; SD005608-SD005610.
"Web Site Links: . . . "; Electronic Marketplace Report, No. 16, vol. 9; Aug. 22, 1995; SD005611-SD005613.
"Interactive Media & Marketing . . . "; Advertising Age; Dec. 11, 1995; SD005614-SD005615.
"Major Companies, Ad Agencies . . . "; Business Wire; Feb. 5, 1996; SD005616-SD005617.
"First Advertising Server Launched . . . "; Business Wire; Feb. 5, 1996; SD005618-SD005619.
"Interactive; Focalink and Doubleclick . . . "; Kim Cleland; Advertising Age, p. 30; Feb. 5, 1996; SD005620-SD005621.
"First Advertising Server Launched . . . "; Business Wire; Feb. 5, 1996; SD005622-SD005623.
"Major Companies, Ad Agencies . . . "; Business Wire; Feb. 5, 1996; SD005624-SD005625.
Web Personals Report; Oct. 12, 1995; Z00001-Z00009 / SD027072-SD027080.
FocaLink Technology; Aug. 30, 1995; Z00010-Z00011 / SD027081-SD027082.
Web Personals stats; Aug. 22, 1995; Z00012-Z00013 / SD027083-SD027084.
For Immediate Release; Hyperlink Advertising Explodes on the World Wide Web; http://link.w3.com; Z00014 / SD027085.
Interactive Age; The Newspaper for Electronic Commerce; Z00015-Z00019 / SD027086-SD027090.
Link Marketing, LLP; Z00020-Z00021 / SD027091-SD027092.
Link Marketing; Z00022-Z00027 / SD027093-SD027098.
LinkMarket; David Zinman et al.; Z00028-Z00030 / SD027099-SD027101.
LinkMarket; David Zinman et al.; Z00031-Z00032 / SD027102-SD027103.
LinkMarket; David Zinman et al.; Z00033-Z00056 / SD027104-SD027127.
FocalLink Media Services, Inc.; David Zinman et al.; Aug. 2, 1995; Z00057-Z00070 / SD027128-SD027141.
Saturn Banner Ad Placement; Aug. 25, 1995; Z00071 / SD027142.
Sponsorable Site—Riddle Du Jour; Aug. 26, 1995; Z00072-Z00074 / SD027143-SD027145.
Saturn Banner Ad Placement; Aug. 27, 1995; Z00075 / SD027146.
FocaLink Technology; Aug. 30, 1995; Z00076-Z00077 / SD027147-SD027148.
Question for you; Sep. 7, 1995; Z00078-Z00079 / SD027149-SD027150.
Information Request; Sep. 12, 1995; Z00080 / SD027151.
Update and Miscellaneous; Sep. 22, 1995; Z00081-Z00083 / SD027152-SD027154.
FocalLink: request for ISN ad traffic data (fwd); Sep. 26, 1995; Z00084-Z00085 / SD027155-SD027156.
Saturn Ad Placements; Sep. 28, 1995; David Zinman; Z00086 / SD027157.
RE> Saturn Ad Placements; Sep. 29, 1995; Adam@utne.co; Z00087 / SD027158.
RE: Advertising Update; Oct. 3, 1995; Eric Ver Ploeg; Z00088-Z00089 / SD027159-SD027160.
RE>>Saturn Ad Placements; Sep. 29, 1995; wigley©utne.com; Z00090 / SD027161.
Re: Test Parameters (fwd); Oct. 23, 1995; Jason Strober; Z00091-Z00092 / SD027162-SD027163.
Re: Rest Parameters; Oct. 23, 1995; Jason Strober; Z00093-Z00094 / SD027164-SD027165.
Proposal (fwd); Oct. 23, 1995; Jason Strober; Z00095-Z00096 / SD027166-SD027167.
Advertising advisory board; Oct. 25, 1995; David Zinman; Z00097-Z00099 / SD027168-SD027170.
Contact at Netcom; Oct. 26, 1995; David Zinman; Z00100 / SD027171.
CMP Technical Contact; Oct. 30, 1995; Jason Strober; Z00104 / SD027172.
From ad age today . . . ; Oct. 30, 1995; Karen Johnson; Z00105-Z00106 / SD027173-SD027174.
We need to get on this; Oct. 31, 1995; David Zinman; Z00107 / SD027175.
Web site pricing draft; Nov. 7, 1995; Jason Strober; Z00108 / SD027176.
Heads up . . . (fwd); Nov. 8, 1995; David Zinman; Z00109-Z00110 / SD027177-SD027178.
Proposal to Intel; Nov. 13, 1995; Jason Strober; Z00111-Z00114 / SD027179-SD027182.
FocaLink white paper; Nov. 13, 1995; Jason Strober; Z00115-Z00116 / SD027183-SD027184.

(56) References Cited

OTHER PUBLICATIONS

FocaLink Media Services; Nov. 14, 1995; David Zinman; Z00117-Z00119 / SD027185-SD027187.
I/Traffic & Dave Carlick; Nov. 14, 1995; David Zinman; Z00120 / SD027188.
FocaLink white paper; Nov. 15, 1995; David Zinman; Z00121-Z00123 / SD027189-SD027191.
Re: FocaLink Meeting (fwd); Nov. 20, 1995; Karen Johnson; Z00124-Z00125 / SD027192-SD027193.
Microsoft ads through FocaLink; Nov. 21, 1995; Jason Strober; Z00126 / SD027194.
Re: Who's in and who's out (fwd); Nov. 21, 1995; Jason Strober; Z00127-Z00128 / SD027195-SD027196.
Intel update (fwd); Nov. 23, 1995; Jason Strober; Z00129-Z00130 / SD027197-SD027198.
Saturn reports; Dec. 5, 1995; Jennifer Ratner; Z00134-Z00140 / SD027199-SD027205.
November Report; Dec. 5, 1995; Jennifer Ratner; Z00141-Z00146 / SD027206-SD027211.
FocaLink Media Services; Dec. 6, 1995; David Zinman; Z00147 / SD027212.
FocaLink Media Services; Dec. 6, 1995; David Zinman; Z00148 / SD027213.
FocaLink Media Services; Dec. 6, 1995; David Zinman; Z00149 / SD027214.
FocaLink for the Layman; Dec. 6, 1995; David Zinman; Z00150 / SD027215.
Microtargeting; Dec. 7, 1995; David Zinman; Z00151 / SD027216.
Info on FocaLink Media Services; Dec. 11, 1995; David Zinman; Z00152-Z00154 / SD027217-SD027219.
FocaLink Media Services; Dec. 11, 1995; David Zinman; Z00155-Z00156 / SD027220-SD027221.
Catch-up time; Dec. 11, 1995; David Zinman; Z00157 / SD027222.
Info on FocaLink; Dec. 13, 1995; David Zinman; Z00158-Z00160 / SD027223-SD027225.
Intel Ad on Dilbert Site; Dec. 13, 1995; David Zinman; Z00161 / SD027226.
Re: Intel Ad on Dilbert Site; Dec. 13, 1995; David Zinman; Z00162 / SD027227.
FocaLink Beta Test on SmartBanner; Dec. 14, 1995; David Zinman; Z00163 / SD027228.
I/Pro Mtg Today; Dec. 19, 1995; David Zinman; Z00164 / SD027229.
Eric Smith Quote (fwd); Jan. 10, 1996; David Zinman; Z00165 / SD027230.
FocaLink Communications, Inc.; Jan. 10, 1996; David Zinman; Z00166 / SD027231.
Re: Advertisers for wyp.net; Jan. 12, 1996; David Zinman; Z00167 / SD027232.
Quote for Press Release; Jan. 15, 1996; David Zinman; Z00168 / SD027233.
Re: Quote for Press Release; Jan. 16, 1996; "thomas mark"; Z00169 / SD027234.
Re: Quote for Press Release (fwd); Jan. 16, 1996; David Zinman; Z00170-Z00171 / SD027235-SD027236.
Re> **Ad Placement Notific; Jan. 19, 1996; Dan_Stoller©anlsf.com; Z00172-Z00173 / SD027237-SD027238.
Invitation; Jan. 25, 1996; wilkins@eit.com; Z00174 / SD027239.
Focalink; Jan. 25, 1996; David Zinman; Z00175 / SD027240.
SmartBanner Reports; Jan. 25, 1996; David Zinman; Z00176 / SD027241.
RE: Focalink; Jan. 26, 1996; Rick Vorhaus; Z00177 / SD027242.
Comments; Jan. 29, 1996; David Zinman; Z00178-Z00182 / SD027243-SD027247.
Poppe Tyson/Internet Advertising Network Alliance; Feb. 26, 1996; Ron Kovas; Z00183 / SD27248.
Fyi; Feb. 5, 1996; "Roger Follis"; Z00184-Z00185 / SD027249-SD027250.
Focalink Communications; Feb. 5, 1996; David Zinman; Z00186-Z00188 / SD027251-SD027253.
Microsoft Update; Feb. 5, 1996; Margaret Bond; Z00189 / SD027254.
Focalink Communications; Feb. 6, 1996; David Zinman; Z00190-Z00192 / SD027255-SD027257.
Focalink Communications; Feb. 6, 1996; David Zinman; Z00193-Z00195 / SD027258-SD027260.
Focalink Communications; Feb. 6, 1996; David Zinman; Z00196-Z00198 / SD027261-SD027263.
[Fwd: Re: DoubleClick and IAN]; Feb. 6, 1996; Jason Strober; Z00199 / SD027264.
Focalink Communications; Feb. 6, 1996; David Zinman; Z00200-Z00202 / SD027265-SD027267.
Test With Focalink; Feb. 7, 1996; David Zinman; Z00203 / SD027268.
Urgent—Microsoft Ad Placement; Feb. 7, 1996; David Zinman; Z00204 / SD027269.
Test for Microsoft Banner; Feb. 8, 1996; Joel Bassuk; Z00205 / SD027270.
ZDNet Test; Margaret Bond; Feb. 8, 1996; Z00206 / SD027271.
URLs; Feb. 8, 1996; Dan Stoller; Z00207-Z00208 / SD027272-SD027273.
HeadsUp Feb. 9, 1996 (20 stories)<CD58M010>; Feb. 9, 1996; An Information Service of Individual Inc.; Z00209-Z00212 / SD027274-SD027277.
Focalink Communications; Feb. 13, 1996; David Zinman; Z00213 / SD027278.
Targeting; Feb. 13, 1996; Michael Wang; Z00214 / SD027279.
Re: Cookies!; Feb. 15, 1996; David Zinman; Z00215 / SD027280.
Focalink; Feb. 22, 1996; Jason Strober; Z00216 / SD027281.
Focalink/Microsoft I.E.; Feb. 23, 1996; Margee Bond; Z00217-Z00218 / SD027282-SD027283.
Cookies; Mar. 6, 1996; David Zinman; Z00219 / S0027284.
Did I send this 2x; Apr. 3, 1996; Z00220-Z00222 / SD027285-SD027287.
Answer to your request; Apr. 8, 1996; Z00223 / SD027288.
Site Letter; Apr. 10, 1996; Z00224-Z00225 / SD027289-SD027290.
Oracle and Intel; Apr. 12, 1996; Z00226 / SD027291.
Doubleclick; Apr. 16, 1996; Z00227 / SD027292.
Open Market Licenses With NetGravity; May 6, 1996; Z00228 / SD027293.
Fact check; May 12, 1996; Z00229 / SD027294.
IDG; May 17, 1996; Z00230-Z00231 / SD027295-SD027296.
Daily Spectrum; May 20, 1996; Z00232-Z00242 / SD027297-SD027307.
Fact check; May 20, 1996; Z00243 / SD027308.
Cookie FAQ; May 21, 1996; Z00244 / SD027309.
Focalink Communications; May 21, 1996; Z00245-Z00246 / SD027310-SD027311.
Network World Fusion; May 22, 1996; Z00247 / SD027312.
Looming issue; Jul. 13, 1996; Z00248-Z00249 / SD027313-SD027314.
Cookies & privacy ? / Gernan Press; Jul. 15, 1996; Z00250 / SD027315.
Cookies & privacy ? / German Press; Jul. 16, 1996; Z00251 / SD027316.
DoubleClick; Sep. 5, 1996; Z00252-Z00253 / SD027317-SD027318.
Infoseek Business Terms; Sep. 7, 1996; Z00254-Z00256 / SD027319-SD027321.
SmartBanner ads on HotWired; Sep. 11, 1996; Z00257 / SD027322.
Statement of Work; Sep. 23, 1996; Z00258-Z00259 / SD027323-SD027324.
NetGravity Releases Adserver 2.0; Oct. 21, 1996; Z00260-Z00263 / SD027325-SD027328.
"Focalink"; DC004278A.
"FocaLink Services"; FocaLink Media Services, Inc.; DC004278B-DC004278C.
"Welcome to Focalink!"; Focalink Communications; DC004278D-DC004278CC.
"Welcome to Focalink!"; Focalink Communications; DC004278DD-DC004278XX.
"Link Marketing"; handwritten page; MA0001.

(56) References Cited

OTHER PUBLICATIONS

"Link Marketing"; LinkMarket; MA0002-MA0007.
"LinkMarket"; David Zinman et al.; MA0008-MA0027.
"Link Marketing, LLP"; MA0028-MA0029.
"Link Marketing LLP"; MA0030-MA0038.
"Escapes"; Web page; MA0039-MA0040.
"Industry Overview"; FocaLink Media Services, Inc.; MA0041-MA0053.
"Executive Summary"; Focalink Communications Confidential; printed Jul. 30, 1997; MA0054-MA0109.
"Focalink Communications"; Feb. 1996; MA0110-MA0149.
Examination Report for corresponding Japanese Application No. 2000-564333, mailed May 26, 2009.
Kosiur, David, *Understanding Electronic Commerce*, Microsoft Press, 1997, pp. 69-71.
Tanaka, Shinji, "Development of Multimedia Business," *Business Communication*, vol. 35, No. 2, Feb. 1, 1998, pp. 116-123.

\* cited by examiner

NETWORK FOR DISTRIBUTION OF RE-TARGETED ADVERTISING

CROSS REFERENCE TO RELATED APPLICATIONS

This is a continuation of U.S. patent application Ser. No. 09/362,008, filed Jul. 27, 1999, now pending, which claims the benefit under 35 U.S.C. §119(e) of U.S. Provisional Application No. 60/095,146, filed Aug. 3, 1998. This is a continuation-in-part of U.S. patent application Ser. No. 09/094,949, filed Jun. 15, 1998, now pending, which claims the benefit under 35 U.S.C. §119(e) of U.S. Provisional Application No. 60/048,940, filed Jun. 16, 1997, and U.S. Provisional Application No. 60/049,877, filed Jun. 17, 1997.

FIELD OF THE INVENTION

This invention relates to methods of delivery of advertisements and measuring responses to those delivered advertisements, and in particular relates to the targeting of advertisements delivered over networks such as the internet.

BACKGROUND OF THE INVENTION

In advertising, it is considered highly desirable to target advertisements to the appropriate potential customer base, rather than to broadcast advertisements in general. It has long been known that, for example, advertisements for computers should generally not appear in magazines on gardening and, conversely, advertisements for gardening tools should not appear in magazines on computers. Similarly, advertisers have generally targeted their advertisements on television to programs appropriate for the desired customer base.

Internet Advertising

The recent development of on-line networks, such as America On-Line, Compuserve, and the Internet, has led to "on-line" advertising. For example, on the Internet, often such on-line advertisements will appear on a web page, such as an ad banner on the top or the bottom of the page. When the user views a web page using a browser such as Internet Explorer or Netscape, the ad banner appears at the appropriate location. The user may then try to find out more information regarding the advertisement by selecting the advertisement (clicking through on that banner) by the use of the mouse or other pointing device. Clicking on an ad banner (click through) causes an HTTP message to be generated by the browser using the information encapsulated in association with the ad banner. Click through sends a request for an object with a given URL address to a different appropriate web site to access, for example, the advertiser's home page.

Nonetheless, such ad banner advertising has had, so far, a poor rate of response because it is untargeted advertising. Thus, someone who is totally uninterested in computers other than they happen to be on the Internet, may continually see advertisements for computers. On the other hand, someone who is interested in computers may continually see advertisements for gardening tools when browsing through a particular web site. Thus it is highly desirable to have a method of targeting the advertising to the appropriate user. In addition, it is also important for the advertisers to track response to the advertisements and to acquire as much information about those people responding to the advertisements for targeting those same people at later dates.

Advertising Server Technology

Targeted Advertising

Targeted advertising is the selection of advertising based on some characteristic of the viewer. For example, displaying an ad at a particular time of day in a certain web site relies on the demonstrated demographics of the viewership for that web site at that time of day. Various criteria for selection of targeted advertising include:
1. The number of times the advertisement has been previously viewed by the user,
2. the user's ID,
3. the user's IP address,
4. the user's cookie,
5. the user's login code,
6. the user's digital certificate,
7. the user's geographic location,
8. the user's time zone,
9. the user's country,
10. the user's domain type,
11. the user's Internet service provider,
12. the user's organization type,
13. the user's employer,
14. the user's industry type,
15. the user's company size,
16. the user's number of employees,
17. types of advertisements previously viewed by the user and
18. types of advertisements previously clicked by the user.

To deliver targeted advertising on the Internet, an advertising server is provided as a node on the network. The various advertising banners are stored on the network advertising server. When a user using a web browser accesses a web page that is affiliated with the advertising server (an affiliate web site), the affiliate's web page encoding includes an embedded reference to an object provided by the advertising server. The imbedded reference causes the user's browser to contact the advertising server to provide the advertising image or information that will appear on the accessed web page as displayed by the user's browser. Using the address information and/or other information passed by the user's browser to the advertising server, including the page being accessed by the user, the advertising server determines an appropriate advertisement to select for the particular user.

If the user decides to respond to the advertisement selected by the advertising server by clicking on the ad banner, the advertising server logs the fact of click through in order to have more information about the given user and to collect statistics on the effectiveness of the advertisement. A process derive for deriving a user profile is used for compiling information on users of TCP/IP networks for use by the advertising server. By compiling the information on networks and user selections, the advertising server is able to compile information that can be used for targeting advertising.

Also in response to user click through, the advertising server provides the URL of the advertiser's web site to which the selected banner relates. Thus, a system comprising the user's browser, one or more affiliate web sites, one or more advertiser web sites and at least one advertising server, form a network for the distribution of targeted advertising from the advertiser to the affiliate and ultimately to the viewer. The terms "advertising server" and "advertisement server" are used interchangeably herein refer to a server on a network that selects an advertisement for display to a user.

For targeted advertising, past behavior of other users are used to gauge the effectiveness of advertising. Banner ads that were not clicked on are less likely to be selected for display to other users in the future, while banner ads that had a high click through rate are more likely to be selected for display to others in the future. Direct ads that do not result in a sale are less likely to be selected for display to other users in the future, while direct ads that do result in a sale are more likely to be selected for display to others in the future.

In a similar fashion, behavior at the advertiser's web site is used to gauge the effectiveness of the advertiser's web pages. Web pages that promote responses (further browsing, making a purchase or providing information) are more likely to be used in the future, while advertiser web pages that are not effective in promoting a response are less likely to be used by the advertiser in the future.

SUMMARY OF THE INVENTION

Re-Targeted Advertising

While targeted advertising uses past actions of other viewers to select a present ad, re-targeted advertising uses the past responses of the present viewer to select a present ad. In comparison to targeted advertising in which an ad is selected based on responses of other viewers, re-targeted advertising is history specific to the present user. The present invention is embodied in a system by which present viewers who have been previous viewers of untargeted (or targeted) advertising, are retargeted based on their past response to the prior (targeted or untargeted) advertising. More specifically, the present invention is embodied in a system whereby a new follow up (re-targeted) advertisement from a specific advertiser who targeted that viewer previously, is selected for that viewer based on the viewer's own past behavior at that specific advertiser's web site.

To implement re-targeted advertising, a list of actions of each visitor at each advertiser's site is collected and reported back to the advertisement server. In one embodiment, the advertiser's web site reports activity in real time. In another embodiment, the advertiser's web site keeps a user log file of visitor activity and reports the user log file back to the advertisement server. Reporting of user log files may be by email or any other file transfer technique back to the advertisement server, where the user log files and other user data are merged.

Reported advertising log files and other user data form a database at the advertisement server, used for selecting re-targeted advertising. Advertisements based on prior behavior of the current viewer are selected based on a variety of criteria. Various criteria for selection of re-targeted advertising include:
1. whether there was no purchase made after several recent visits,
2. whether there was no purchase made but a specific product or product category was reviewed,
3. whether there have been many recent purchases made at the advertiser's web site,
4. whether there have been prior purchases or visits made some time ago, but no recent purchases or visits made at the advertiser's web site, and
5. whether the user has registered at the advertiser's web site.

Using one or more of each of the foregoing criteria, a re-targeted ad is selected by the advertising server for display at the user's browser. Re-target ads may be any of:
1. mailing a special coupon for a given product to prior visitors who have looked at web pages for such given product, but have not purchased,
2. sending a reminder message to past purchasers who have not purchased in the last 90 days, or
3. sending a reminder message to the top 10% of an advertiser's customers.

As a result of collecting user activity lists, the data is mined for prospects for future advertisements. A configured list of users is selected and stored for future re-targeting. Then, when the advertising server receives a request to select an advertisement, it checks the user identity in a look up table to see if the user has been previously selected for re-targeting. If the user is on the previously configured list, a re-targeted ad is selected.

DETAILED DESCRIPTION

Figure 1:
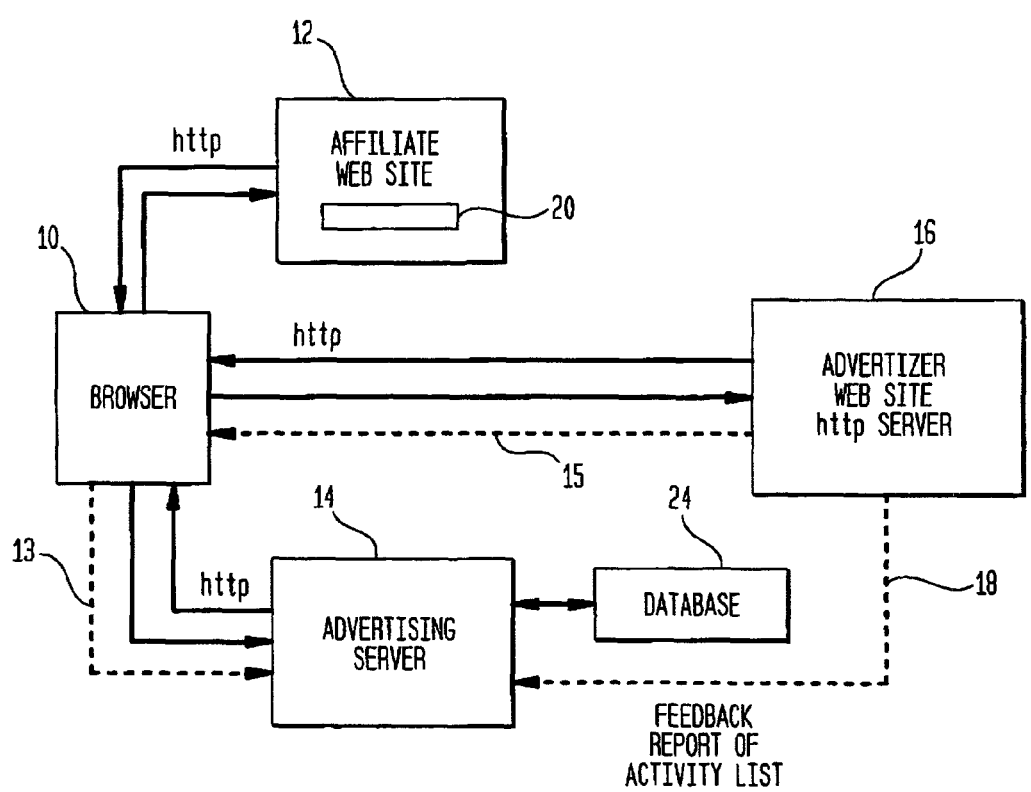
FIG. 1 is a block diagram of a system for automatic placement of re-targeted advertisements in accordance with the present invention.

A network in accordance with one embodiment of the present invention is shown in FIG. 1. In particular, a system for the delivery of advertising over networks includes a user with a browser 10. The system includes at least one affiliate web site 12. An affiliate web site is a publisher or other content provider having advertising space 20 to fill. Central to the ad network system is an advertising server 14, which includes a predictive model and algorithms for selection of advertising in accordance with various criteria. The advertising server 14 further communicates with a database 24, which contains the activity history of users on various web sites. Also part of the system network is one or more advertiser web sites 16. Advertiser web sites can be generalized as any type of commerce engine. An activity list (lists of user activities at the advertiser's web site) are compiled in the advertising web site 16. A feedback path 18 permits the advertiser web site to communicate the activities of visitors at the advertiser's web site 16, back to the advertising server 14.

The feedback path 18 may be achieved by a number of alternative mechanisms. For bulk feedback of data accumulated in a user activity list, the advertiser periodically emails the information directly, or transfers it in bulk form in a file transfer operation. Activity list updates are performed as often as necessary, and may even be reported at the conclusion of each individual visit.

In a second embodiment, feedback of individual activities of the user at an advertiser site 16 may be communicated in real time back to the advertising server 14 using by spotlight tags placed on specific pages in the advertiser's web site. A spotlight tag is a minimal graphic (e.g., a one pixel image) containing a redirect message back to the advertising server 14. Spotlight tags are placed on web pages by the advertiser and contain other imbedded information such as information identifying the specific advertiser web page (as for example, identifying a purchase confirmation page stating "thank you for your order" etc.)

When the user requests (i.e., visits) an advertiser page containing a spotlight tag, a reply message 15 redirects the users browser 10 back to the advertising server 14 via request 13 to access the minimal one pixel graphic image. The requested image is not significant to the event. However, by this process, the advertiser web site 16 provides real time reporting of user activities while the user is in the advertising web site 16. The advertising server 14 assembles the activity list for each user. In yet another alternative embodiment a specially configured proxy server is interposed between the user's browser 10 and the advertiser's web site 16. The proxy server intercepts, interprets and monitors transactions between the user's browser 10 and the advertiser's web site 16.

In operation, when a user browsing on the Internet accesses an affiliate's web site 12, which would typically include media content and advertising space 20, the user's browser 10 generates an http message to request the information from the desired web page. In response to the http message, the affiliate's web site 12 transmits one or more reply messages back to the user's browser 10 containing the information to be displayed to the user 10. In addition, for the content of the advertising space 20, the affiliate web site 12 forwards a redirect message containing the URL of the advertising server 14. The browser is redirected to the advertising server 14 which selects an appropriate advertisement for the advertising space 20.

At the advertising server 14, a banner advertisement to be displayed in the advertising space 20 is selected from a local database 24 containing advertising information and user data. The selected ad banner is then displayed to the user. Upon clicking through when the user selects the advertising banner 20, the browser 10 is connected to the advertiser's web site 16. Targeted advertisements are ads selected by identifying the user and matching an advertisement to the user, based on various criteria. Re-targeted advertisements are selected by matching past behavior of a particular user to that particular user's past activities.

Figure 2:
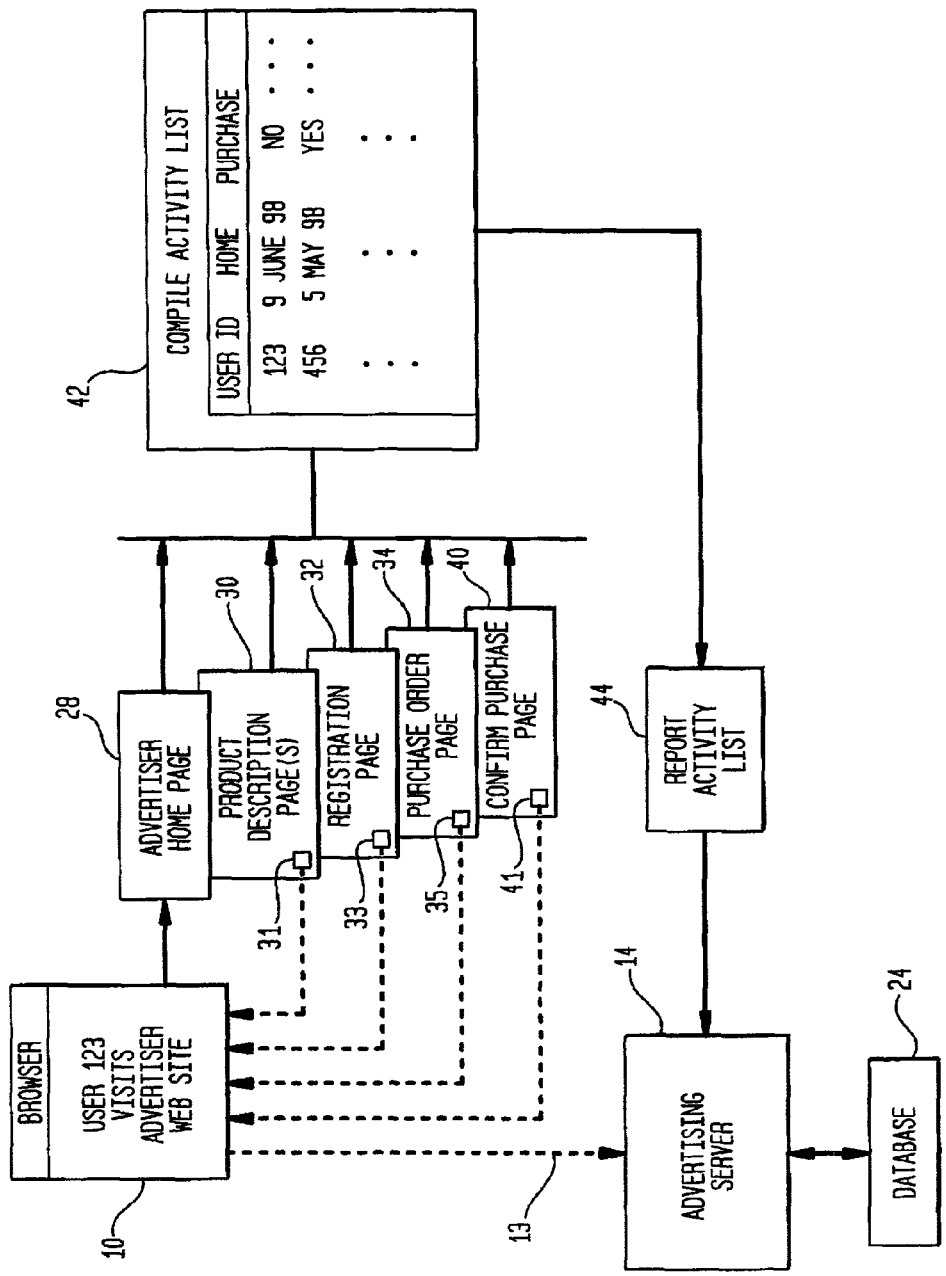
FIG. 2 is a block diagram illustrating two alternate embodiments of a data collection system for reporting user activities at an advertiser's web site to an advertising server in accordance with the present invention.

Two of the ways of collecting past user activity are illustrated in FIG. 2. An advertiser web site comprises linked pages such as a home page 28, one or more product description pages 30, one or more registration pages 32, one or more purchase order pages 34 with corresponding purchase confirmation pages 40. Each of the advertiser web pages include a corresponding spotlight tag. For example, product description page 32 has a tag 31, registration page 32 has a spotlight tag 31, purchase order page 34 has spotlight tag 35, and confirmation page 40 has a spotlight tag 41.

When the viewer accesses any page having at spotlight tag 31, 33, 35 and 41, a reply message back to the browser 10 redirects the browser to send a message 13 back to the advertising server 14. Receipt of the message 13 back at the advertising server 14 in effect, reports (in real time) to the advertising server that the user has accessed the a respective page while browsing at the advertiser's web site. Reported user activity is stored in the local database 24 for further processing.

Alternatively, the user activity list 42 is compiled at the advertisers web site. The activity list is reported back 44 to the advertising server 14 by email or ftp (file transfer protocol).

User privacy is preserved because the user is never specifically identified. The user ID in table is typically assigned arbitrarily using cookie enabled browser features. At no time is any personally identifiable information stored in the server or used for contacting an individual.

Figure 3:
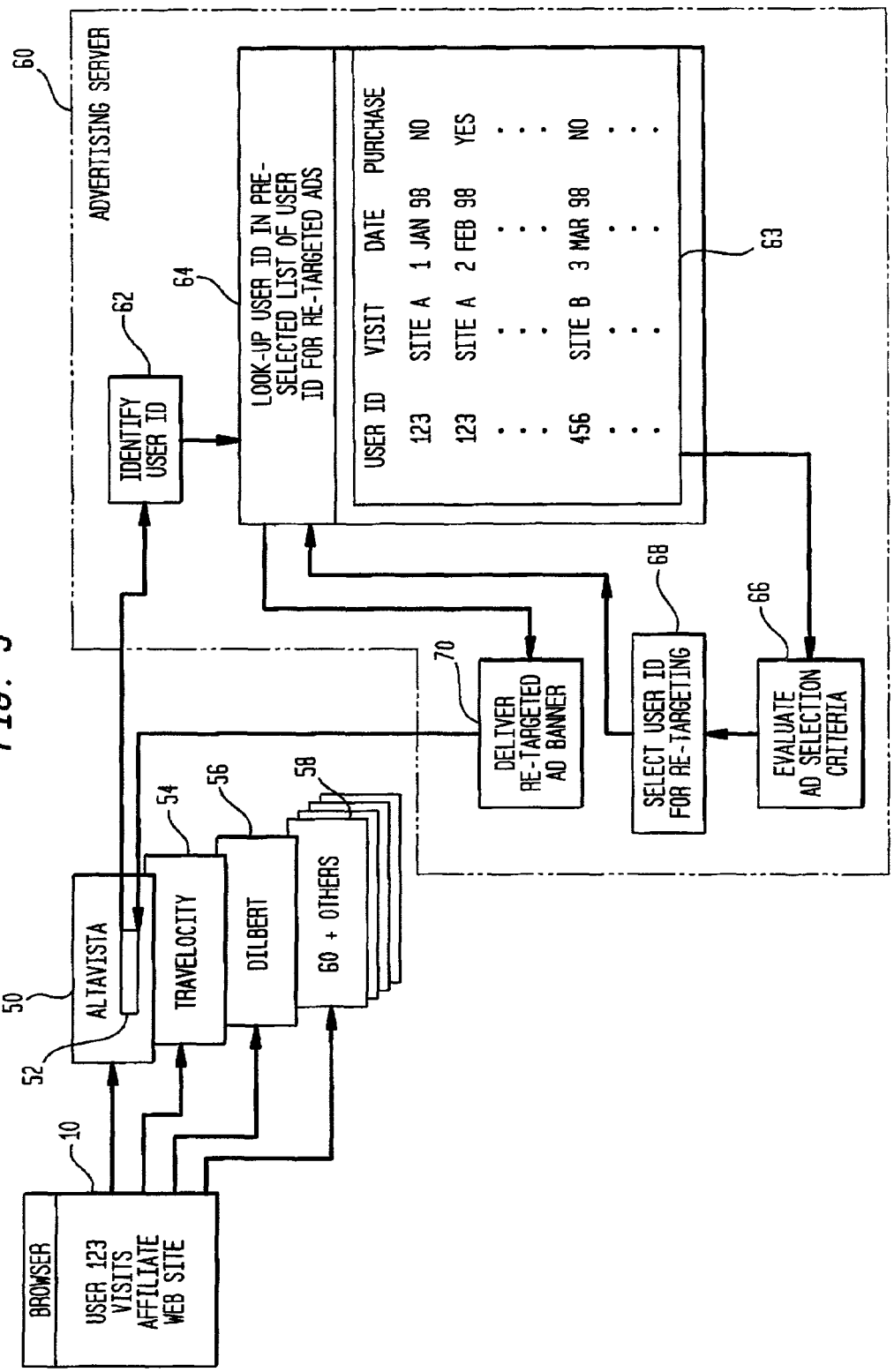
FIG. 3 is a block diagram illustrating the selection of re-targeted advertisements from past user activity.

Use of the user activity list to generate and distribute re-targeted advertisements is illustrated in FIG. 3. Past user activity is stored in an activity table 63 (part of database 24 in FIG. 1). The stored data is evaluated and matched to selection criteria at step 66 to determine those users suitable for re-targeting. An example selection criterion is a screen meeting the following parameters: users who looked at product X description at a given web site at least twice in the last two weeks, but did not purchase. The result of the selection criteria step 66 is to generate a list of user ID's suitable for future re-targeting. The derived list of candidate user ID's is stored in a lookup table 64.

In operation, a user browser 10 (illustrated as user 123) visits a affiliate web site, such as AltaVista 50, Travelocity 54, Dilbert 56 or any of 60+ other affiliated web sites on the network. The ad banner space 52 contains a redirect to the advertising server (14 in FIG. 1) where an ad banner corresponding to a selected advertiser will be selected for delivery to the AltaVista web page.

At the advertising server the user ID is determined at step 62. The user ID is looked up in the list of user ID's pre-selected for a re-targeted advertisement. If the user is found in the table 64 as having been pre-selected, then the pre-selected ad banner is delivered to the AltaVista web page. For example, a discount coupon for product X may be delivered.

In such manner, past activities of users is used as a criteria for selection of re-targeted advertising.

What is claimed is:

1. A method for online re-targeted advertisement selection, comprising:
  receiving a description of online activities for a collection of online identities for users accessing one or more affiliate web sites;
  identifying a desired behavior, the desired behavior describing a user interaction that indicates that an online identity demonstrating the desired behavior is more likely to be responsive to a re-targeted advertisement;
  analyzing the description of online activities to determine whether a particular online identity appearing in the description of the online activities demonstrates the desired behavior;
  generating a watch list of users to receive re-targeted advertisements based on analyzing the description of online activities;
  monitoring, in real-time and from the one or more affiliate web sites, information related to user interaction with the one or more affiliate web sites;
  receiving, from within the monitored information, a request to display advertising content to a user;
  determining that the user appears in the watch list of users to receive re-targeted advertisements; and
  selecting, in response to the request, advertising content for display based upon determining that the user appears in the watch list of users to receive re-targeted advertisements.

2. The method according to claim 1, wherein the request to display advertising content is received from the user via a redirect message from an affiliate Web site.

3. The method according to claim 1, wherein the description of online activities is an email message received from the Web site, the email message providing a list of prior activities of the user at the Web site.

4. The method according to claim 1, wherein the description of online activities is a file transfer protocol (FTP) message received from the Web site, the FTP message providing a list of prior activities of the user at the Web site.

5. The method according to claim 1, wherein the description of online activities is a tag included in a redirect message from the Web site, the tag identifying a specific Web page and indicating a prior activity of the user at the Web site.

6. The method according to claim 1, wherein the description of online activities is provided by a proxy server interposed between the user and the Web site, the proxy server providing a list of prior activities of the user at the Web site.

7. The method according to claim 1, wherein the description of online activities includes a description of which Web page was visited on the Web site.

8. The method according to claim 1, wherein the description of online activities includes a description of whether the user made a purchase on the Web site.

9. The method according to claim 1, wherein the description of online activities includes a description of whether the user has become registered on the Web site.

10. The method according to claim 1, wherein the description of online activities is listed in a stored table.

11. The method according to claim 10, wherein the watch list of re-targeted advertisements are created from the stored table.

12. The method according to claim 11, wherein a re-targeted advertisement is created for the user if the user made more than one recent visit to the Web site to review a product, but did not purchase the product.

13. The method according to claim 12, wherein the re-targeted advertisement created for the user is a coupon to purchase the product at the Web site.

14. The method according to claim 11, wherein a re-targeted advertisement is created for the user if the user made a purchase prior to a predetermined time at the Web site, but did not make a purchase subsequent to the predetermined time at the Web site.

15. The method according to claim 14, wherein the re-targeted advertisement is a reminder message specifying the Web site.

16. The method according to claim 11, wherein a re-targeted advertisement is created for the user if the user made a predetermined amount of purchases within a predetermined time period at the Web site.

17. The method according to claim 16, wherein the re-targeted advertisement is a message indicating appreciation to customers of the Web site.

18. The method according to claim 1, wherein the advertising content is an ad banner.

19. The method of claim 5, wherein the tag is a graphic that includes a redirect message to an advertising server.

20. A computer system for online re-targeted advertisement selection, comprising:
   a storage device configured to store advertising content associated with a Web site;
   a communications device configured to communicate with the Web site and a user;
   and an advertisement server configured to:
   receive a description of online activities for a collection of online identities for users accessing one or more affiliate web sites;
   identify a desired behavior, the desired behavior describing user interaction that indicates that an online identity demonstrating the desired behavior is more likely to be responsive to a re-targeted advertisement;
   analyze the description of online activities to determine whether a particular online identity appearing in the description of the online activities demonstrates the desired behavior;
   generate a watch list of users to receive re-targeted advertisements based on analyzing the description of online activities;
   monitor, in real-time and from the one or more affiliate web sites, information related to user interaction with the one or more affiliate web sites;
   receive, from within the monitored information, a request to display advertising content to a user;
   determine that the user appears in the watch list of users to receive re-targeted advertisements; and
   select, in response to the request, advertising content for display based upon determining that the user appears in the watch list of users to receive re-targeted advertisements.

21. The system according to claim 20, wherein the request to display advertising content is received from the user via a redirect message from an affiliate Web site.

22. The system according to claim 20, wherein the description of online activities is an email message received from the Web site, the email message providing a list of prior activities of the user at the Web site.

23. The system according to claim 20, wherein the description of online activities is a file transfer protocol (FTP) message received from the Web site, the FTP message providing a list of prior activities of the user at the Web site.

24. The system according to claim 20, wherein the description of online activities is a tag included in a redirect message from the Web site, the tag identifying a specific Web page and indicating a prior activity of the user at the Web site.

25. The system according to claim 20, wherein the description of online activities is provided by a proxy server interposed between the user and the Web site, the proxy server providing a list of prior activities of the user at the Web site.

26. The system according to claim 20, wherein the description of online activities includes a description of which Web page was visited on the Web site.

27. The system according to claim 20, wherein the description of online activities includes a description of whether the user made a purchase on the Web site.

28. The system according to claim 20, wherein the description of online activities includes a description of whether the user has become registered on the Web site.

29. The system according to claim 20, wherein the description of online activities is listed in a stored table.

30. The system according to claim 29, wherein the watch list of re-targeted advertisements are created from the stored table.

31. The system according to claim 30, wherein a re-targeted advertisement is created for the user if the user made more than one recent visit to the Web site to review a product, but did not purchase the product.

32. The system according to claim 31, wherein the re-targeted advertisement created for the user is a coupon to purchase the product at the Web site.

33. The system according to claim 30, wherein a re-targeted advertisement is created for the user if the user made a purchase prior to a predetermined time at the Web site, but did not make a purchase subsequent to the predetermined time at the Web site.

34. The system according to claim 33, wherein the re-targeted advertisement is a reminder message specifying the Web site.

35. The system according to claim 30, wherein a re-targeted advertisement is created for the user if the user made a predetermined amount of purchases within a predetermined time period at the Web site.

36. The system according to claim 35, wherein the re-targeted advertisement is a message indicating appreciation to customers of the Web site.

37. The system according to claim 20, wherein the advertising content is an ad banner.

38. The system of claim 24, wherein the tag is a graphic that includes a redirect message to an advertising server.

39. A machine-readable medium storing instructions adapted to be executed by a processor to:
- receive a description of online activities for a collection of online identities for users accessing one or more affiliate web sites;
- identify a desired behavior, the desired behavior describing user interaction that indicates that an online identity demonstrating the desired behavior is more likely to be responsive to a re-targeted advertisement;
- analyze the description of online activities to determine whether a particular online identity appearing in the description of the online activities demonstrates the desired behavior;
- generate a watch list of users to receive advertisements based on analyzing the description of online activities;
- monitor, in real-time and from the one or more affiliate web sites, information related to user interaction with the one or more affiliate web sites;
- receive a request to display advertising content to a user;
- determine that the user appears in the watch list of users to receive re-targeted advertisements; and
- select, in response to the request, advertising content for display based upon determining that the user appears in the watch list of users to receive re-targeted advertisements.

40. The medium according to claim 39, wherein the request to display advertising content is received from the user via a redirect message from an affiliate Web site.

41. The medium according to claim 39, wherein the description of online activities is an email message received from the Web site, the email message providing a list of prior activities of the user at the Web site.

42. The medium according to claim 39, wherein the description of online activities is a file transfer protocol (FTP) message received from the Web site, the FTP message providing a list of prior activities of the user at the Web site.

43. The medium according to claim 39, wherein the description of online activities is a tag included in a redirect message from the Web site, the tag identifying a specific Web page and indicating a prior activity of the user at the Web site.

44. The medium according to claim 39, wherein the description of online activities-is provided by a proxy server interposed between the user and the Web site, the proxy server providing a list of prior activities of the user at the Web site.

45. The medium according to claim 39, wherein the description of online activities includes a description of which Web page was visited on the Web site.

46. The medium according to claim 39, wherein the description of online activities includes a description of whether the user made a purchase on the Web site.

47. The medium according to claim 39, wherein the description of online activities includes a description of whether the user has become registered on the Web site.

48. The medium according to claim 39, wherein the description of online activities is listed in a stored table.

49. The medium according to claim 48, wherein the list of re-targeted advertisements are created from the stored table.

50. The medium according to claim 49, wherein a re-targeted advertisement is created for the user if the user made more than one recent visit to the Web site to review a product, but did not purchase the product.

51. The medium according to claim 50, wherein the re-targeted advertisement created for the user is a coupon to purchase the product at the Web site.

52. The medium according to claim 49, wherein a re-targeted advertisement is created for the user if the user made a purchase prior to a predetermined time at the Web site, but did not make a purchase subsequent to the predetermined time at the Web site.

53. The medium according to claim 52, wherein the re-targeted advertisement is a reminder message specifying the Web site.

54. The medium according to claim 49, wherein a re-targeted advertisement is created for the user if the user made a predetermined amount of purchases within a predetermined time period at the Web site.

55. The medium according to claim 54, wherein the re-targeted advertisement is a message indicating appreciation to customers of the Web site.

56. The medium according to claim 39, wherein the advertising content is an ad banner.

57. The medium of claim 43, wherein the tag is a graphic that includes a redirect message to an advertising server.

58. A system for online advertisement selection, comprising:
- means for receiving a description of online activities for a collection of online identities for users accessing one or more affiliate web sites;
- means for identifying a desired behavior, the desired behavior describing user interaction that indicates that an online identity demonstrating the desired behavior is more likely to be responsive to a re-targeted advertisement;
- means for analyzing the description of online activities to determine whether a particular online identity appearing in the description of the online activities demonstrates the desired behavior;
- means for generating a watch list of users to receive re-targeted advertisements based on analyzing the description of online activities;
- means for monitoring, in real-time and from the one or more affiliate web sites, information related to user interaction with the one or more affiliate web sites;
- means for receiving, from within the monitored information, a request to display advertising content to a user;
- means for determining that the user appears in the watch list of users to receive re-targeted advertisements; and
- means for selecting, in response to the request, advertising content for display based upon determining that the user appears in the watch list of users to receive re-targeted advertisements.

59. A method for online re-targeted advertisement selection, comprising:
- receiving a description of online activities for a collection of online identities for users accessing one or more affiliates;
- identifying a user behavior describing a user interaction that indicates that an online identity demonstrating the user behavior is more likely to be responsive to a re-targeted advertisement;
- analyzing the description of online activities to determine whether a particular online identity appearing in the description of the online activities demonstrates the user behavior;
- generating a marketing list of online identities to receive re-targeted advertisements based on analyzing the description of online activities;
- monitoring, in real-time and from the one or more affiliates, information related to user interaction with the one or more affiliates;
- receiving, from within the monitored information, a request to display advertising content to a user having an online identity;

determining that the online identity appears in the marketing list of online identities to receive re-targeted advertisements; and selecting, in response to the request, advertising content for display based upon determining that the online identities appears in the marketing list of online identites to receive re-targeted advertisements.

* * * * *

UNITED STATES PATENT AND TRADEMARK OFFICE
CERTIFICATE OF CORRECTION

| | | |
|---|---|---|
| PATENT NO. | : 8,566,154 B2 | Page 1 of 1 |
| APPLICATION NO. | : 10/082069 | |
| DATED | : October 22, 2013 | |
| INVENTOR(S) | : Dwight Allen Merriman et al. | |

It is certified that error appears in the above-identified patent and that said Letters Patent is hereby corrected as shown below:

On the Title Page, Item (56) References Cited

Page 2, under "U.S. Patent Documents", Column 2, Line 24:
Delete "Angeles, et al." and insert -- Angles, et al. --, therefor.

Page 3, under "Other Publications", Column 1, Line 7:
Delete "Ubiquitious" and insert -- Ubiquitous --, therefor.

Page 3, under "Other Publications", Column 1, Line 11:
Delete "Reoport" and insert -- Report --, therefor.

Page 5, under "Other Publications", Column 2, Line 33:
Delete "S0027284." and insert -- SD027284. --, therefor.

Page 5, under "Other Publications", Column 2, Line 53:
Delete "Gernan" and insert -- German --, therefor.

In the Claims

Column 11, Line 6, Claim 59:
Delete "identites" and insert -- identities --, therefor.

Signed and Sealed this
Sixth Day of May, 2014

Michelle K. Lee
*Deputy Director of the United States Patent and Trademark Office*

UNITED STATES PATENT AND TRADEMARK OFFICE
CERTIFICATE OF CORRECTION

PATENT NO.         : 8,566,154 B2
APPLICATION NO.    : 10/082069
DATED              : October 22, 2013
INVENTOR(S)        : Merriman et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2847 days.

Signed and Sealed this
Twenty-fourth Day of March, 2015

Michelle K. Lee
*Director of the United States Patent and Trademark Office*